United States Patent [19]

Hashimoto et al.

[11] Patent Number: 5,314,553
[45] Date of Patent: May 24, 1994

[54] FIBER-REINFORCED RESIN MEMBER AND METHOD OF PRODUCING THE SAME

[75] Inventors: Hisayoshi Hashimoto, Ushiku; Morio Tamura, Tsuchiura, both of Japan

[73] Assignee: Hitachi Construction Machinery Co., Ltd., Tokyo, Japan

[21] Appl. No.: 635,502

[22] PCT Filed: Dec. 21, 1989

[86] PCT No.: PCT/JP89/01283

§ 371 Date: Jan. 7, 1991

§ 102(e) Date: Jan. 7, 1991

[87] PCT Pub. No.: WO91/09724

PCT Pub. Date: Jul. 11, 1991

[51] Int. Cl.$^5$ .............. B32B 31/20; B65H 81/00
[52] U.S. Cl. .............. 156/153; 156/150; 156/172; 156/173; 156/294; 29/888.046; 29/888.048
[58] Field of Search .............. 428/608, 614, 626, 666, 428/674; 277/235 A, DIG. 6; 29/888.046, 888.047, 888.048, 888.452; 156/294, 150, 153, 172, 173; 427/367

[56] References Cited

U.S. PATENT DOCUMENTS 4,450,610  5/1984  Schäper ............... 29/888.046
4,941,669  7/1990  Fujisawa et al. ............... 428/614

FOREIGN PATENT DOCUMENTS 0103386   1/1926  Austria ............... 277/235 A
48029071  8/1946  Japan .
52-140584 11/1977  Japan .
58-167118 10/1983  Japan .
63-067422  3/1988  Japan .
63-166519  7/1988  Japan .
63-166522  7/1988  Japan .
63-249628 10/1988  Japan .
1-320137  12/1989  Japan .

Primary Examiner—Benjamin R. Fuller
Assistant Examiner—Valerie Ann Lund
Attorney, Agent, or Firm—Fay, Sharpe, Beall, Fagan, Minnich & McKee

[57] ABSTRACT

A fiber-reinforced resin member of the present invention comprises a solid or hollow rod member (2) made of a fiber-reinforced resin material (5, 6), a soft metal layer (3) formed on the outer periphery of the rod member by squeezing a soft metal on the outer periphery of the rod member so as to cause the soft metal to adhere under pressure to the outer periphery of said rod member, and a hard metallic deposit (4) formed on the surface of the sot metal layer. The present invention also provides a method of producing the fiber-reinforced resin member.

6 Claims, 3 Drawing Sheets

FIBER-REINFORCED RESIN MEMBER AND METHOD OF PRODUCING THE SAME

TECHNICAL FIELD

The present invention relates to a fiber-reinforced resin member and a method of producing the member, and particularly to a fiber-reinforced resin member and a method of producing the same which is used as a member required to have an external surface having surface accuracy, such as the piston rod of a hydraulic or pneumatic cylinder, the spool of a hydraulic or pneumatic valve, the piston rod of an engine, the photosensitive drum of an electron copying machine or the like, and which combines high strength with light weight.

BACKGROUND ART

Solid or hollow fiber-reinforced resin members, which are formed by winding a strand of continuous filaments impregnated with a resin, increasingly attract attention because of their light weight and high strength For example, refer to JP, A, 63-166519, 63-166522 and 63-249628. In these publications, JP, A, 63-166519 discloses the use of a fiber-reinforced resin member for the piston rod of a hydraulic or pneumatic cylinder. However, there is a problem in that, when a fiber-reinforced resin member is used as a member such as the piston rod of a hydraulic or pneumatic cylinder, the spool of a hydraulic or pneumatic valve or the like, which is required to have an external surface having surface accuracy, it is difficult to secure the surface accuracy.

Namely, although JP, A, 63-166519 discloses the use of a fiber-reinforced resin member for the piston rod of a hydraulic or pneumatic cylinder, since the piston rod of the hydraulic or pneumatic cylinder hermetically slides in the cylinder, high surface accuracy is required for providing a seal between the rod and the sliding surface of the cylinder. In practice, it is therefore necessary to perform treatment for securing the surface accuracy of the external surface after a fiber-reinforced resin member rod has been produced in accordance with the proposal of JP, A, 63-166519 and then subjected to surface finish of the external surface by mechanical polishing. An example of such treatment is plating treatment for coating the external surface with a rigid material such as chromium or the like. This plating treatment is effected by a general method for plating the surfaces of conventional synthetic resins in accordance with the following procedure:

After the external surface of the fiber-reinforced resin member produced has been finished by mechanical polishing, a layer of a soft metal such as copper or the like is first formed on the external surface by plating, and a layer of a hard metal such as chromium or the like is then formed on the soft metal layer by plating.

However, since the fiber-reinforced resin member is made of a soft resin and a fiber material composed of continuous hard filaments, fine cracks occur in the soft resin portion when the external surface of the fiber-reinforced resin member is polished. When the external surface is plated to form the soft metal layer thereon, therefore, the plating solution used penetrates into the cracks. This causes insufficient coating of the soft metal layer and consequently the difficulty in coating of the hard metal layer with high strength. Further, since the soft resin portion is polished earlier than the hard fiber material, the hard fiber material remains raised on the surface, and it is thus difficult to finish the surface flatly. It is thus impossible to obtain high surface accuracy because, even if the external surface is subjected to plating suitable for the soft metal layer and the hard metal layer, unevenness remains on the surface of the hard metal layer in correspondence with the unevenness on the polished surface of the fiber-reinforced resin member.

It is an object of the present invention to provide a fiber-reinforced resin member which can attain high surface accuracy and a method of producing the resin member.

DISCLOSURE OF THE INVENTION

In order to achieve the object, the present invention provides a fiber-reinforced resin member comprising a solid or hollow rod member, which is formed by using a fiber-reinforced resin material, a soft metal layer which is formed on the outer periphery of the rod member by squeezing a soft metal on the outer periphery of the rod member so as to cause the soft metal to adhere under pressure to the outer periphery, and a hard metallic deposit which is formed on the soft metal layer.

Since the soft metal layer is formed on the outer periphery of the rod member by squeezing the soft metal on the outer periphery so as to cause the soft metal to adhere under pressure to the outer periphery, even if cracks or wavy unevenness is formed in the outer periphery of the rod member, such cracks or wavy unevenness is completely buried in the soft metal layer. High surface accuracy can be thus obtained by forming the hard metallic deposit on the soft metal layer.

It is preferable that the rod member is formed by thermosetting the fiber-reinforced resin material and then mechanically polishing the outer periphery, and that the soft metal layer is caused to adhere under pressure to the outer surface of the thus-formed rod member.

It is also preferable that the soft metal layer is caused to adhere under pressure to the outer surface of the rod member by squeeze-molding a thin wall pipe made of a soft metal by the use of a die. In this case, many concave grooves may be formed in the inner surface of the thin wall pipe, or an adhesive may be previously applied to the outer periphery of the rod member.

It is further preferable that the outer periphery of the soft metal layer is mechanically polished after it has been formed on the outer surface of the rod member by pressure adhesion, and that the hard metallic deposit is formed on the outer surface of the soft metal layer.

The soft metal layer is preferably a copper layer, and the hard metallic deposit is preferably a hard chromium deposit.

The present invention also provides a method of producing a fiber-reinforced resin member comprising a first step of forming a solid or hollow rod member by using a fiber-reinforced resin material, a second step of causing a soft metal to adhere under pressure to the outer surface of the rod member by squeezing the soft metal to form a soft metal layer on the outer periphery of the rod member, and a third step of forming a hard metallic deposit on the surface of the soft metal layer.

In the first step, it is preferable to thermoset the fiber-reinforced resin material and then mechanically polish the outer periphery thereof.

In the second step, it is preferable that the rod member is inserted into a thin wall pipe made of a soft metal, and the thin wall pipe is then squeezed and molded by the use of a die so that the soft metal layer is caused to adhere under pressure to the outer surface of the rod member. In this step, many concave grooves may be formed in the inner periphery of the thin wall pipe so as to increase the adhesive strength between the rod member and the soft metal layer. Alternatively, an adhesive may be previously applied to the outer periphery of the rod member so that the soft metal layer is caused to adhere under pressure to the outer surface, to which the adhesive is applied.

In the second step, it is also preferable to mechanically polish the outer surface of the soft metal layer after the soft metal layer has been caused to adhere under pressure to the outer surface of the rod member.

BEST MODE OF CARRYING OUT THE INVENTION

An embodiment of the present invention in which the present invention is applied to the production of the piston rod of a hydraulic cylinder is described below with reference to the drawings.

Figure 1:
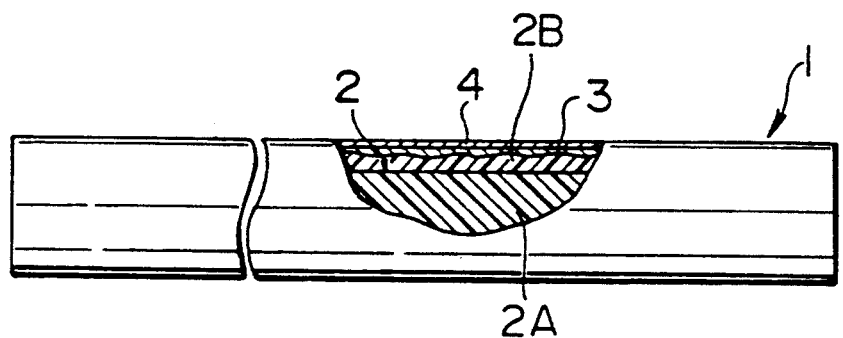
FIG. 1 is a partialy sectional view of a piston rod in an embodiment of the present invention.
Figure 2:
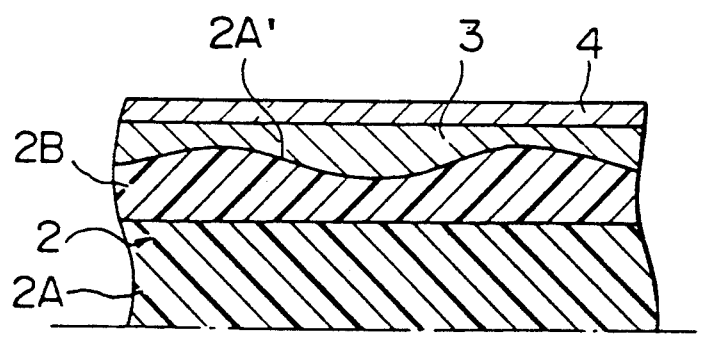
FIG. 2 is an enlarged view of a principal portion of the same.

In FIGS. 1 and 2, reference numeral 1 denotes the piston rod of a hydraulic cylinder, the piston rod 1 comprising a solid rod member 2 made of a fiber-reinforced resin material, a soft metal layer 3 formed on the outer periphery of the rod member 2, and a hard metallic deposit 4 formed on the outer periphery of the soft metal layer 3.

Figure 3:
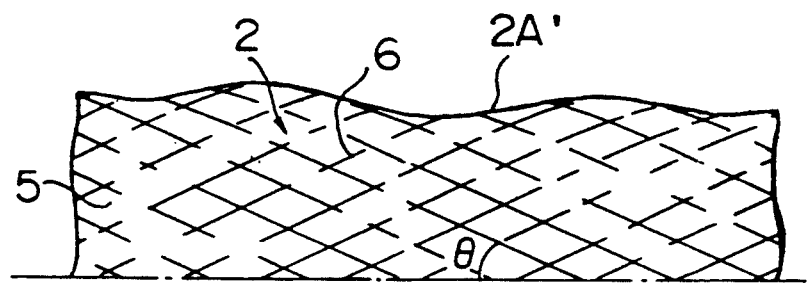
FIG. 3 is a drawing of the appearance of the rod member which is formed in an early step of the method of producing the piston rod.

The rod member 2 comprises a core 2A formed of a usual fiber-reinforced resin material by means such as drawing or the like and a plurality of wound layers 2B which are formed on the surface of the core 2A by cross winding of a fiber material 6, which is composed of a strand of continuous filaments impregnated with a resin 5, at a predetermined winding angle $\theta$ as shown in FIG. 3, using a filament winding method. Examples of the resin 5 that may be used in the wound layers 2B include epoxy resins, polyester resins, polyimide resins and the like, all of which have thermosetting and adhesive properties. Examples of the fiber material 6 that may be used include carbon fibers, glass fibers, aramid fibers, alumina fibers, silicon carbide fibers and the like. Namely, the external wound layers 2B of the rod member 2 are made of the soft resin 5 and the hard fiber material 6. The proportion of the resin 5 in the wound layers 2B is about 40 to 70%.

Figure 4:
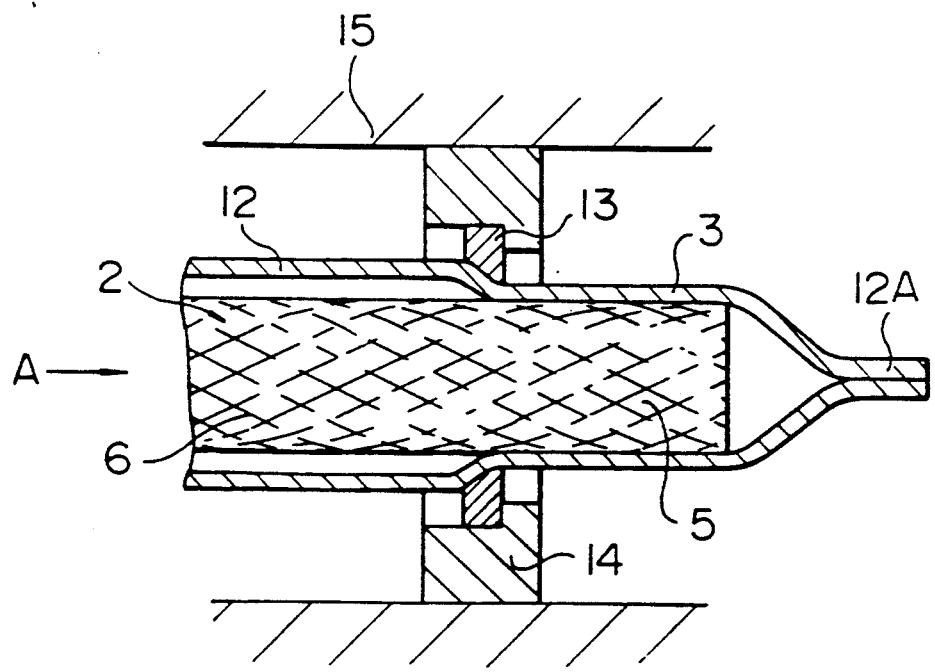
FIG. 4 is a sectional view which shows the step of forming a soft metal layer in the method of producing the piston rod.

The soft metal layer 3 is formed by squeezing a thin wall pipe 12 made of a soft metal such as copper or the like by the use of a die 13 so as to cause the thin wall pipe 12 to adhere under pressure to the outer periphery of the rod member 2, as shown in FIG. 4. The external surface of the rod member 2 is completely coated with the soft metal layer 3. In this step, for example, when the rod member 2 having an external diameter of about 22.4 mm is formed, the thin wall pipe 12 used has an external diameter of about 27 mm and a thickness of about 0.51 mm, and the minimum internal diameter of the die 13 is about 23.4 mm. The die 13 is also supported by a fixing ring 14 which is positioned by a chuck 15, as shown in FIG. 4.

When the rod member 2 is inserted into the thin wall pipe 12 in a state wherein one end 12A of the thin wall pipe 12 is closed, as shown in FIG. 4, and is pushed into the die 13 together with the thin wall pipe 12 in the direction shown by the arrow A, the die 13 causes the thin wall pipe 12 to adhere under pressure to the outer surface of the rod member 2 by the same method as extrusion or drawing to form the soft metal layer 3 on the outer periphery of the rod member 2. During this step, the external periphery of the thin wall pipe 12 is forced through the die 13 so that the soft metal layer 3 having an external diameter of about 23.4 mm and a thickness of about 0.45 to 0.51 mm is coated on the surface of the rod member 2. In addition, the soft metal material 3 is molded into a form having a smooth surface by the squeeze molding. The binding force (the shear fracture strength of the soft metal layer 3) is about 400 kgf/20 mm.

The hard metallic deposit 4 is formed by plating hard chromium on the soft metal layer 3 after the surface treatment thereof so as to completely coat the outer periphery of the soft metal layer 3.

The method of producing the piston rod of a hydraulic cylinder in accordance with the embodiment having the above-described arrangement is described below.

The solid round rod member 2 is first formed by cross winding of the fiber material 4, which is composed of a strand of continuous filaments impregnated with the resin 5, at a predetermined winding angle $\theta$ as shown in FIG. 3 using a filament winding method or the like, on the core 2A, formed of a usual fiber-reinforced resin material by means of drawing or the like. The method of producing the rod member 2 is described in detail in JP, A, 63-166519. The rod member 2 is then placed in a curing furnace (not shown), in which the resin 5 is thermoset, and is then subjected to surface finish by mechanically polishing the outer periphery of the rod member 2. Since the outer layers 2B of the rod member 2 are made of the soft resin 5 and the hard fiber material 6, as described above, fine cracks or wavy unevenness 2A' occurs in the soft resin portion of the outer periphery of the rod member 2 after polishing, as shown in FIGS. 2 and 3. In the drawings, the wavy unevenness 2A' is magnified.

As shown in FIG. 4, the rod member 2 is then inserted into the thin wall pipe 12, as described above, and the thin wall pipe 12 is then caused to adhere under pressure to the outer periphery of the rod member 2 by squeezing the thin wall pipe 12 on the rod member 2 by the use of the die 13 to form the soft metal layer 3 on the outer periphery of the rod member 2.

Figure 5:
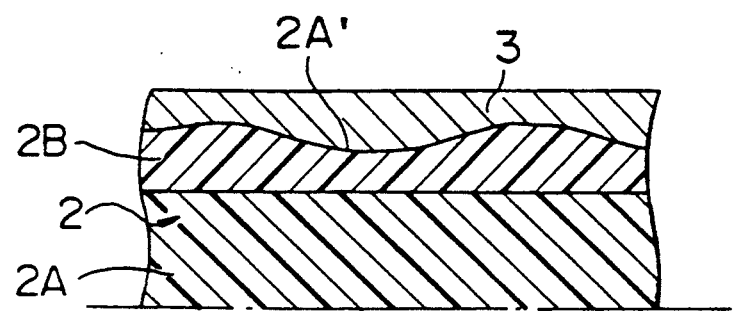
FIG. 5 is a sectional view of the piston rod before a hard metallic deposit is formed.

After unnecessary portions such as one end 12A and the like of the thin wall pipe 12 have been cut, the outer periphery of the soft metal layer 3 is polished so as to uniformly finish the outer periphery of the soft metal material. In this step, the soft metal layer 3 is finished to a thickness of about 0.2 to 0.3 mm. This state is shown in FIG. 5. In this drawing, the wavy unevenness 2A' is also magnified.

After the surface of the soft metal layer 3 has been uniformly finished in the above-described manner, the surface of the soft metal layer 3 is plated with hard chromium to form the hard metallic plating 4, as shown in FIG. 2.

In this embodiment, since the thin wall pipe 12 is caused to adhere under pressure to the outer periphery of the rod member 2 made of a fiber-reinforced resin material by a squeezing method using the die 13 to form the soft metal layer 3 on the outer periphery of the rod member 2, even if cracks occur in the external periphery of the rod member 2, or even if wavy unevenness 2A' is formed therein, the cracks or unevenness 2A' are completely buried in the soft metal layer 3, and no unevenness is thus formed in the surface of the soft metal layer 3 in correspondence with the unevenness 2A. Since the layer 3 is made of a soft metal such as copper, the surface of the layer 3 can be easily smoothly finished by mechanical polishing. The piston rod can be thus finished to a surface form having high accuracy by the hard metallic deposit 4 and coated therewith with high strength.

When the piston rod is incorporated into a hydraulic cylinder, good sealing properties can be secured between the piston rod and the opposite member such as a rod guide or the like. In addition, since the sliding resistance between the piston rod and the opposite member can be surely reduced even if the piston rod is used for a long time, damage of the sealing member can be reduced. It is also unnecessary to perform high-accuracy surface working for the rod member before the soft metal layer 3 is formed, and therefore an improvement in workability and a reduction in the production cost can be secured.

Figure 6:
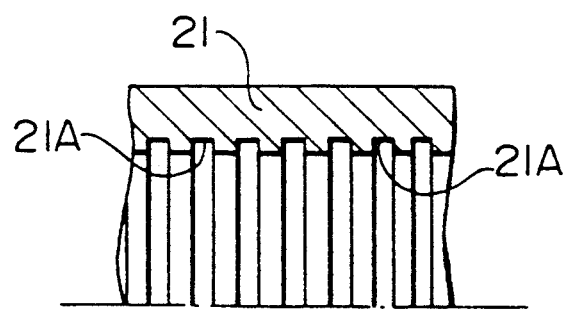
FIG. 6 is a sectional view of a thin wall pipe used in the step of forming a soft metal layer in a production method in another embodiment of the present invention.

Another embodiment of the present invention is described below with reference to FIG. 6. In this embodiment, the shape of the thin wall pipe used for forming the soft metal layer 3 is different from that of the first embodiment. Namely, the thin wall pipe 21 used in this embodiment has many concave annular grooves 21A, 21A . . . , which are formed in the inner periphery thereof as shown in FIG. 6, so that the strength of adhesion to the rod member 2 is increased. The thin wall pipe 21 used is made of a soft metal such as copper or the like in the same way as in the first embodiment and is squeezed on the outer periphery of the rod member 2 by the use of the die 13 (refer to FIG. 4) to form the soft metal layer 3.

It is obvious that this embodiment configured as described above permits the attainment of substantially the same effect as that of the first embodiment. Particularly, since this embodiment has the many concave grooves 21A formed in the inner periphery of the thin wall pipe 21, the adhesive strength between the soft metal layer 3 and the rod member 2 is increased, whereby a stronger coating can be formed.

In each of the above embodiments, the soft metal layer 3 is formed on the outer periphery of the rod member 2 by squeezing the thin wall pipe 12 or 21 by the use of the die 13. However, an adhesive may be previously applied to the outer periphery of the rod member 2, and the thin wall pipe may be then squeezed by the use of the die 13. In this case, the adhesive strength of the soft metal layer can be further increased.

Although each of the above embodiments concerns as an example the piston rod of a hydraulic cylinder, the present invention is not limited to this. For example, the present invention can be applied to the piston rod of a pneumatic cylinder, the spool of an oil valve, the piston rod of an engine, the photosensitive drum of an electron copying machine, and various members required to have surface accuracy. Further, the rod member 2 may be made hollow to form a hollow product.

INDUSTRIAL APPLICABILITY

In the present invention, even when cracks or unevenness is formed in the outer periphery of a rod member made of a fiber-reinforced resin material, the cracks or unevenness can be coated with a soft metal layer which can be formed so as to have a smooth surface. It is therefore possible to coat the surface of the soft metal layer with a hard metallic deposit with high strength and significantly improve the surface accuracy.

What is claimed is:

1. A method of producing a fiber-reinforced resin member comprising a first step of forming a solid or hollow rod member by winding on a core a fiber material composed of a strand of continuous filaments impregnated with a resin, a second step of thermosetting said resin in said rod member and thereafter mechanically polishing an outer periphery of the rod member to finish a surface of the outer periphery, a third step of forming a soft metal layer on the outer periphery of said rod member by squeezing a soft metal on the finished outer periphery surface of said rod member so as to cause said soft metal to adhere under pressure to said outer periphery surface, and a fourth step of forming a hard metallic deposit on the surface of said soft metal layer to provide a fiber-reinforced resin member.

2. A method of producing a fiber-reinforced resin member according to claim 1, wherein, in said third step, the outer surface of said soft metal layer is mechanically polished after said soft metal has been caused to adhere under pressure to the outer surface of said rod member.

3. A method of producing a fiber-reinforced resin member according to claim 1, wherein, in said third step, an adhesive is previously applied to the outer periphery of said rod member, and said soft metal layer is caused to adhere under pressure to said outer surface to which said adhesive is applied.

4. A method of producing a fiber-reinforced resin member according to claim 1, wherein, in said third step, said rod member is inserted into a thin wall pipe made of a soft metal, and said soft metal layer is caused to adhere under pressure to the outer surface of said rod member by squeezing said thin wall pipe by the use of a die.

5. A method of producing a fiber-reinforced resin member according to claim 4, wherein said thin wall pipe made of said soft metal has many concave grooves formed in an inner periphery thereof so that the adhesive strength between said rod member and said soft metal layer is increased.

6. A method of producing a fiber-reinforced resin member comprising a first step of forming a solid or hollow rod member by winding on a core a fiber material composed of a strand of continuous filaments impregnated with a resin, a second step of thermosetting said resin in said rod member and thereafter mechanically polishing an outer periphery of the rod member to finish a surface of the outer periphery, a third step of forming a soft metal layer on the outer periphery of said rod member by squeezing a soft metal softer than said fiber material on the finished outer periphery surface of said rod member so as to cause said soft metal to adhere under pressure to said outer periphery surface, and a fourth step of forming a hard metallic deposit on the surface of said soft metal layer to provide a fiber reinforced resin member.

* * * * *